United States Patent Office 3,511,315
Patented May 12, 1970

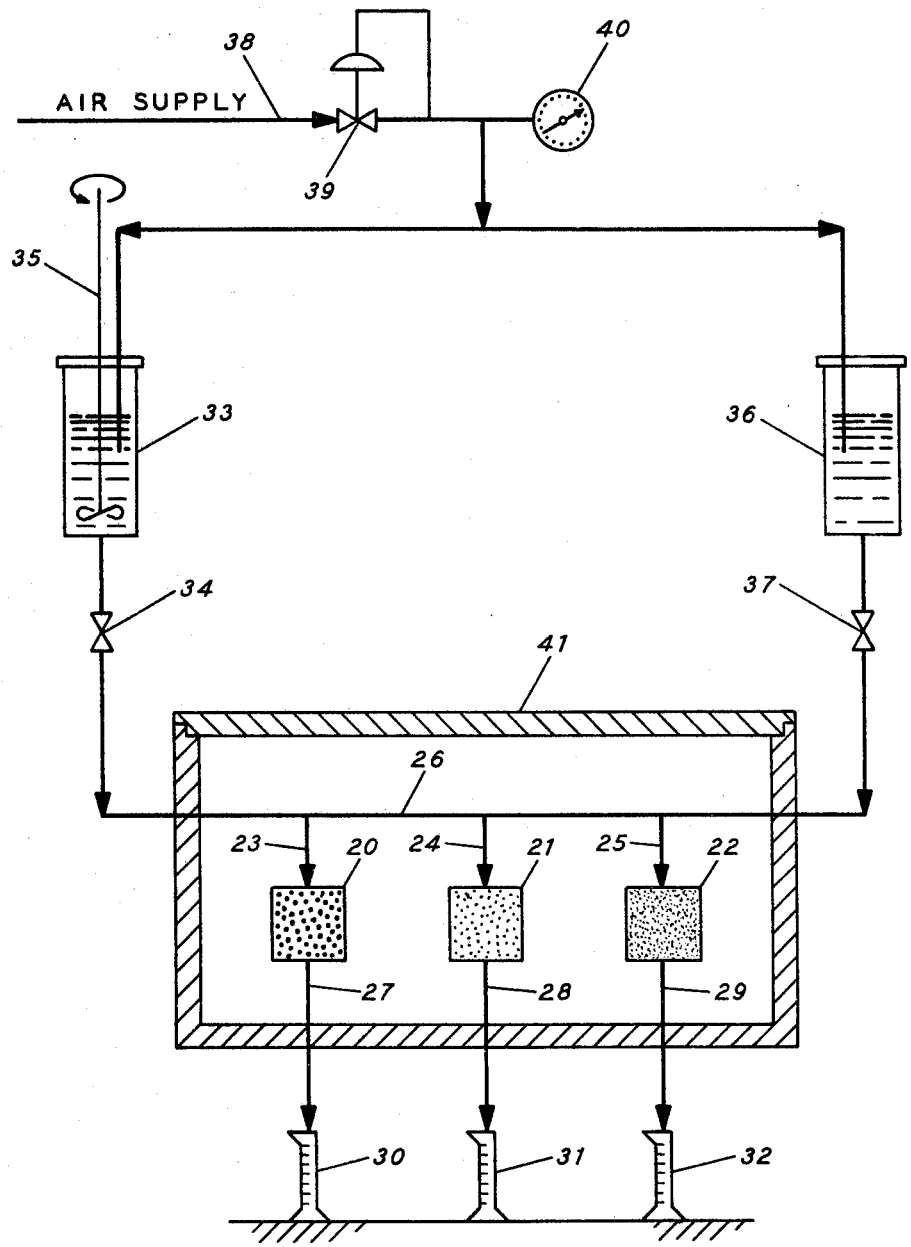

3,511,315
METHOD OF CONSOLIDATING EARTH FORMATIONS USING DIVERTING AGENT
Ralph S. Millhone, Brea, Chester L. Love, La Habra, Alexander S. Allen, Jr., Santa Monica, and Coral L. De Priester, Fullerton, Calif., assignors to Chevron Research Company, San Francisco, Calif., a corporation of Delaware
Filed May 20, 1968, Ser. No. 730,513
Int. Cl. E21b *33/13*
U.S. Cl. 166—295                 4 Claims

ABSTRACT OF THE DISCLOSURE

A composite diverting agent and water scavenger for use before resin in a method of consolidating incompetent earth formations.

---

This invention relates to a method of consolidating an incompetent earth formation which includes loose or unconsolidated sand particles penetrated by a well to prevent invasion of sand or earth particles into the well during fluid production from the formation. More particularly, this invention provides a method of consolidating an incompetent earth formation which has strata of unequal permeability by utilizing a diverting agent in the sand consolidation process to balance the injection profile of the injected fluids to provide for relatively uniform distribution of the various consolidation fluids in the treated sand.

A serious problem present in consolidating unconsolidated formations penetrated by a well is obtaining relatively uniform distribution of the consolidation fluids in sands with different permeabilities. Thus when it is desired to consolidate the sand, it is important that all of the sand in the treated interval be exposed to at least a minimum amount of each of the formation pretreatment and consolidation fluids. This is particularly a difficult problem when large variances in permeability exist in the sand over the interval which is to be consolidated. Various mechanical means for achieving uniform placement of sand consolidation fluids are known. Two such mechanical systems for providing uniform placement of consolidation fluids are shown in U.S. Pats. Nos. 3,318,381 issued May 9, 1967, and 3,362,477 issued Jan. 9, 1968. Mechanical means have proven successful in wells in which there is sufficient space and suitable economics to allow running of the apparatus during well completion or well workover. However, in situations where for economic reasons or where prior completion methods make the use of mechanical means impractical, there is still need for a method of leveling the relative permeabilities of the sands being simultaneously treated to thereby improve fluid distribution and reduce the risk of failure of the consolidation operation. One non-mechanical means of improving resin distribution is the subject of U.S. Pat. 3,134,436. This patent is directed to a low fluid loss resin containing cellulose in the resin mixture to assist in leveling the injection profile of the resin. However, the use of the flow leveling additive in the resin mixture, while useful to prevent loss of resin to highly porous intervals, does not solve the overall problem of improving a sand consolidation operation by promoting a relatively uniform injection profile for all the fluids used in the sand consolidation operation. Thus there is still need for a non-mechanical means of providing for relatively uniform flow into a formation having intervals of different permeability of all the fluids used in a sand consolidation operation.

The present invention is useful in a process of consolidating incompetent earth formations wherein a liquid resin curable to a solid infusible state is injected into the formation followed by the injection of a curing agent to harden the liquid resin and to consolidate the formation. The process is particularly useful where other means of uniform placement are impractical or impossible.

In a broad aspect, the present invention provides for utilizing a permeability leveling agent to provide for more uniform placement of sand consolidation resin in strata having different permeabilities. Thus in accordance with the invention a permeability leveling material is injected into strata prior to the injection of sand consolidation fluids to provide for leveling the permeability of the strata so that the later injected resin will tend to be more uniformly distributed in the strata. The permeability leveling material is carried in a liquid carrier which also acts as a water scavenger to remove water from the formation to better prepare it for the resin which follows. In a particular aspect the invention is carried out by injecting into an interval in which consolidation liquids are to be later injected a mixture of a hydrocarbon oil, a selected polar organic compound preferably a low molecular weight alkanol and a fluid leveling additive. A mixture of the above type is injected into the interval prior to the injection of resin therein. The low molecular weight alkanol acts as a water scavenger and in addition assists in promoting the action of the permeability leveling additive.

The preferred form of the invention provides for injecting into the formation prior to the injection of the consolidation resin a mixture of 100 parts by volume of a hydrocarbon oil, from 15 to 35 parts by volume of a selected low molecular weight alkanol and 0.005 to 0.25 part by weight of a permeability leveling compound per 100 parts by weight of the above mixed liquids. The above noted mixture is an effective diverting agent useful to promote relatively uniform placement of sand consolidation liquids in a formation composed of strata having different permeability. In addition, the mixture is an effective water scavenger useful to remove water from the formation prior to the resin injection step of a sand consolidation operation. The injection of this mixture is followed by the injection of a sand consolidation resin and a suitable curing agent for the resin to provide a permeable consolidated formation in the vicinity of the well.

It is a particular object of the present invention to provide a method of sand consolidation for use in remedial operations or in operations where the use of a mechanical means of distributing the consolidation liquids on a relatively uniform basis is impractical, which method includes the injection into the formation of a composite water scavenger and permeability leveler prior to the injection of the sand consolidation resin.

Further objects and advantages of the present invention will become apparent from the following detailed discussion read in light of the accompanying drawing which is made a part of this specification and which illustrates apparatus used in demonstrations showing the advantages of the present invention.

The figure illustrates a parallel flow apparatus used for simulation of remedial or through tubing workover conditions.

In accordance with the present invention, a mixture of hydrocarbon oil, a permeability leveling material preferably a cellulosic material and a polar organic compound capable of swelling the cellulosic material is injected into a formation prior to the injection therein of a liquid resin useful to consolidate the formation. The mixture containing the cellulosic material and the polar organic compound acts to balance fluid injectivity into the formation and to remove any water which may be in the formation in the vicinity of the well. Water removal is an important step in the consolidation process and must be done to insure adequate strength in the consolidated sand.

The cellulosic materials which may be employed in the practice of the invention are the lower alkyl cellulose ethers, e.g. methylcellulose, ethylcellulose, propylcellulose, butylcellulose and benzycellulose. Ethycellulose is the highly preferred cellulose ether for use in the practice of the invention. Ethylcellulose is obtainable on the market under various trade names such as Ethocel. Ethylcellulose is an ether of cellulose formed by reaction of chloroethane with cellulose which has been reacted with a strong base. The ethylation of cellulose has been long known in the art. Preparation of ethylcellulose is possible by a variety of well known methods. Ethylcellulose is described and methods of making ethylcellulose are disclosed in an article in "Colloid Chemistry" J. Alexander, vol. VI, p. 934, Reinhold, 1946.

Ethylcellulose is available as particulate material. A preferred form of ethylcellulose has a particle distribution such that about 90% of the particles pass a 35-mesh screen and 10% pass a 400-mesh screen. The median particle size is approximately 100-mesh. When mixed with a carrier fluid such as diesel oil containing a selected low molecular weight alkanol ethylcellulose will swell to a volume far exceeding its dry volume. Wet volume to dry volume ratios of between about 3 to 6 are suitable in accordance with the invention. A ratio of about 5:5 is considered optimum. While the swell ratio depends somewhat on time and concentration of alkanol in the carrier fluid, a ratio within the above range will give good results.

Cellulose ethers used in the present invention may have a molecular weight of any value which permits pouring and mixing a composition of the invention without undue thickening. The cellulose is mixed with a hydrocarbon oil and a sufficient amount of a polar organic compound capable of swelling the cellulose at a desirable rate. The polar organic material is preferably a low moecular weight alkanol, for example methanol, ethanol, propanol, butanol, pentanol and hexanol. The preferred polar organic compound for this use is 2-propanol. Controlled swelling of the ethylcellulose was obtained by slurrying dry ethylcellulose with a mixture of 2-propanol and diesel. Fifteen minutes or more contact with between 15–30% by volume 2-propanol in diesel causes swelling of the ethylcellulose to four to five times its original volume. The swelling properties do not change significantly with added time. The mixture is useful as a diverting agent when ethylcellulose is slurried in a mixture of between 15 and 30% by volume 2-propanol and diesel oil. Higher 2-propanol concentrations, i.e., greater than 35%, tend to dissolve the ethylcellulose, while lower 2-propanol concentrations, i.e., less than 15%, give insufficient swelling for adequate diverting in accordance with the present invention.

With reference to the drawing, remedial or through tubing workover conditions were simulated in the parallel flow apparatus of FIG. 2. As there shown, three sleeves 20, 21 and 22 are adapted to be filled with loose sand. Parallel inflow lines 23, 24 and 25 are fed from a common header 26. Each of the sleeves has an outflow line respectively, 27, 28 and 29, and means for measuring the outflow, for example graduated cylinders 30, 31 and 32. A source 33 of diverting compound formed in accordance with the present invention is connected to header 26 through valve 34. A suitable mixing arrangement 35 is provided in the diverting compound source 33. A source 36 of a second fluid is also connected into the header 26 through valve 37. A common air supply to pressure sources 33 and 36 is indicated in line 38 on which is connected suitable back pressure regulator valve 39 and gauge 40. A temperature bath 41 permits control of temperature conditions at each of the three sleeves.

In demonstrations conducted to show the advantages of the present invention, each sleeve 20, 21 and 22 was filled with loose sand and saturated with diesel oil or white oil. Different sands were placed in each of the sleeves to provide sand packs with initial permeability ratios of between 4:1 and 8:1. Tests were run at room temperature and 150° F. Ethylcellulose was placed in a (1:3) 2-propanol:white oil scavenger mixture. Concentrations in the range of $5 \times 10^{-5}$ to $2 \times 10^{-3}$ grams ethylcellulose per cc. fluid mixture were used. Total quantity of the mixture used in the tests ranged from 0.02 to 2.0 grams ethylcellulose average per square inch of sand pack face. Table I presents results from 72° F., 30 p.s.i. differential pressure tests using $2 \times 10^{-3}$ grams per cc. ethylcellulose concentration in (1:3) 2-propanol-white oil to a total of 0.37 gram average per square inch of sand face. Permeability ratio improvement from initial ratios of 4–8:1 to final ratios of 1.2–2.3:1 were obtained.

TABLE I

| Run No. | Sleeve No. | Permeability (md.) Initial | Permeability (md.) Final | Permeability retention | Permeability ratio to Nevada 130 Initial | Permeability ratio to Nevada 130 Final |
|---|---|---|---|---|---|---|
| A | 1 | 28,900 | 2,750 | 9.5 | 4.31 | 1.86 |
|   | 2 | 33,300 | 3,110 | 9.3 | 4.97 | 2.10 |
|   | 3 | 6,700 | 1,480 | 22.1 | 1.00 | 1.00 |
| B | 1 | 28,900 | 2,540 | 8.8 | 5.00 | 1.53 |
|   | 2 | 38,200 | 3,740 | 9.8 | 6.62 | 2.25 |
|   | 3 | 5,770 | 1,660 | 28.8 | 1.00 | 1.00 |
| C | 1 | 34,900 | 2,680 | 7.7 | 4.88 | 1.33 |
|   | 2 | 38,300 | 2,360 | 6.2 | 5.35 | 1.17 |
|   | 3 | 7,150 | 2,010 | 28.2 | 1.00 | 1.00 |
| D | 1 | 44,400 | 2,680 | 6.0 | 6.98 | 1.46 |
|   | 2 | 36,000 | 2,450 | 6.8 | 5.67 | 1.33 |
|   | 3 | 6,350 | 1,840 | 29.0 | 1.00 | 1.00 |
| E | 1 | 4,000 | 3,570 | 8.9 | 6.60 | 2.24 |
|   | 2 | 42,200 | 3,700 | 8.8 | 6.98 | 2.32 |
|   | 3 | 6,050 | 1,590 | 26.3 | 1.00 | 1.00 |
| F | 1 | 36,700 | 2,000 | 5.4 | 5.83 | 1.60 |
|   | 2 | 6,300 | 1,250 | 19.8 | 1.00 | 1.00 |
|   | 3 | 38,300 | 2,790 | 7.3 | 6.09 | 2.23 |
| G | 1 | 42,600 | 3,330 | 7.7 | 8.20 | 1.32 |
|   | 2 | 5,200 | 250 | 48.0 | 1.00 | 1.00 |
|   | 3 | 40,600 | 3,060 | 7.6 | 7.82 | 1.24 |

Effectiveness of the method was further borne out by the following demonstration in which two different permeability sand packs were simultaneously consolidated in parallel Hassler cells. The Hassler cells used in this demonstartion comprise 5 feet long by 1 inch diameter rubber tubes containing sand to be consolidated. The rubber tubes are closed at each end by screened end plugs which permit inflow and outflow of fluids while preventing loss of sand from the rubber tube under pressure. The plugs are adapted to be hermetically sealed into a metal sleeve which surrounds the rubber tube. The sleeve provides a means for exerting pressure on the rubber tube and, therefore, on the sand pack (analogous to the pressure on an incompetent formation from the earth above, known as overburden pressure). Additional equipment includes a pressure tank for storage of fluids prior to their injection into the sand pack; a pump to force fluids through the sand pack; a bath for heating the Hassler cell; and means, such as a graduated cylinder or flask, to measure the outflow of fluids.

In this demonstration, Cell 1 was filled with 24 x 65 sand and Cell 2 was filled with Nevada 130 sand. Both 24 x 65 sand, 95% passing 24-mesh screen and having grains of irregular size and shape, and Nevada 130 sand, 95% passing a 100-mesh screen and having grains of irregular size and shape, were compacted in their respective Hassler cells by vibrating for 15 minutes. Overburden pressure was established and held at 2500 p.s.i. and the temperature set at 150° F. to simulate the conditions of a formation penetrated by a well. The sand packs were saturated with brine (25,000 p.p.m. NaCl) and initial permeability was measured. Diesel oil was next flowed through the sand packs. The diverting agent mixture of this method was then flowed through the sand packs to obtain leveling of permeability variations between Cells 1 and 2, and to remove residual water from the Hassler cells. The sand packs were then consolidated using a curable epoxy resin process wherein a resin solution was injected into the sand packs. This injection was followed by serial injection of suitable permeability flush fluid; and a resin curing agent for the epoxy compound sufficient to cause hardening of a major part of the epoxy compound. After injection of the last fluid, the openings of the end plugs were closed (shut-in) and the treated cores were allowed to consolidate. That permeability leveling, according to this method, was obtained and that each sand pack received consolidation fluids in a markedly improved ratio relative to the initial permeability ratio of the sand packs is shown in Table II.

TABLE II.—EFFECT OF DIVERTING AGENT ON RELATIVE PERMEABILITY VARIATIONS

| | Initial permeability (md.) | Scavenger with diverting agent | Resin | Permeability flush | Activator |
|---|---|---|---|---|---|
| | | Total step throughout volume, cc. | | | |
| Cell No. 1 | 20,000 | 8,900 | 160 | 5,200 | 5,580 |
| Cell No. 2 | 2,400 | 923 | 100 | 3,060 | 2,200 |
| Ratio (1:2) | 8.3 | 9.6 | 1.6 | 1.7 | 2.5 |

As is evident from the above demonstrations, the method of the present invention is very useful in leveling the injection profile in sands of different permeabilities. Further, since the 2-propanol and oil acts as a water scavenger, substantially uniform water removal is accomplished. The formation is now ready for resin injection. The resin is relatively uniformly distributed in the sands because of the greatly improved permeability ratios developed by the method of the invention.

The most desirable injection volume of the fluid leveling mixture which includes the water scavenger will vary somewhat depending on conditions. When using the preferred mixture of the invention, i.e., 25% by volume 2-propanol in diesel oil and 0.005 to 0.25 part by weight ethylcellulose, it is preferred to inject about 9 times as much of the said preferred mixture as the volume of resin to be injected. In any event the volume of the mixture of the present invention should exceed the volume of the resin to be injected by at least three times. Preferably, the volume should be at least about 4 to 5 times the resin volume.

A field test was conducted in accordance with the present invention. A one-inch tubing was run through 2⅜" production tubing to the 11' of production perforations between 7311 and 7336' depths. The production interval was sand packed with 50 cubic feet of fine sand prior to preparing for consolidation. The composite preflush of this method consisting of 0.07 pound of ethylcellulose diverting agent per barrel of water scavenger consisting of an 80-20 mixture of diesel oil and 2-propanol was injected to prepare the formation for consolidation. Consolidation fluids were then injected into the formation. The one-inch tubing was periodically reciprocated through the production interval during placement of preparation and consolidation fluids. Injection data are shown in Table III.

TABLE III

| Cumulative time, minutes | Cumulative volume, barrels | Injection rate, barrels/minute | Surface pressure, p.s.i. |
|---|---|---|---|
| 0 | 0 preflush | 0 | 1,500 |
| 10 | 10 preflush | 1 | 1,500 |
| 31 | 30 preflush | 1 | 1,600 |
| 41 | 40 preflush | 1 | 1,420 |
| 125 | 110 preflush | 1 | 1,500 |
| 138 | 10 resin | .75 | 1,300 |
| 150 | 5 permeability flush | 1 | 1,300 |
| 185 | 20 permeability flush | .25 | 1,150 |
| 202 | 22 permeability flush | 1 | 1,150 |
| 234 | 28 activator | 1 | 1,200 |

The field test is believed to have been successful in uniformly consolidating the formation through a one-inch tubing. Although only a few specific embodiments of the present invention have been described, the invention is not to be limited to only such embodiments but rather by the scope of the appended claims.

We claim:

1. In a process for consolidating incompetent earth formations by injecting a liquid resin curable to a solid infusible state in the formation to consolidate the formation, the improvement which comprises injecting into the formation prior to the injection of the resin a mixture of 100 parts by volume of a hydrocarbon oil and from 15 to 35 parts by volume of a polar organic compound capable of swelling the aforesaid lower alkyl cellulose ether, said mixture having from 0.005 to 0.25 part by weight of a lower alkyl cellulose ether per 100 parts by weight of said mixture.

2. The method of claim 1 further characterized in that the polar organic compounds is an alcohol.

3. In a process for consolidating incompetent earth formations by injecting a liquid resin curable to a solid infusible state in the formation to consolidate the formation, the improvement which comprises injecting into the formation prior to the injection of the resin a mixture of 100 parts by volume of a hydrocarbon oil and from 15 to 35 parts by volume of an alcohol selected from the group consisting of isopropyl, methanol, ethanol, propanol, butanol, pentanol, and hexanol, said mixture having from 0.005 to 0.25 parts by weight of a cellulose ether selected from the group consisting of methylcellulose, ethylcellulose, propylcellulose, butylcellulose and benzylcellulose per 100 parts by weight of said mixture.

4. The method of claim 3 further characterized in that the alcohol is 2-propanol and cellulose ether is ethylcellulose.

References Cited

UNITED STATES PATENTS

| 2,573,690 | 11/1961 | Cardwell et al. | 166—295 |
| 3,123,138 | 3/1964 | Robichaux | 166—295 |
| 3,134,436 | 5/1964 | Means et al. | 166—295 |
| 3,199,590 | 8/1965 | Young | 166—295 |
| 3,339,633 | 9/1967 | Richardson | 166—295 |

STEPHEN J. NOVOSAD, Primary Examiner

PO-1050
(5/69)

UNITED STATES PATENT OFFICE
CERTIFICATE OF CORRECTION

Patent No. 3,511,315            Dated May 12, 1970

Inventor(s) Ralph S. Millhone, Chester L. Love, Alexander S. Allen, Jr., Coral L. DePriester It is certified that error appears in the above-identified patent and that said Letters Patent are hereby corrected as shown below:

Col. 3, line 46 "slurried" should read --slurred--;

Col. 6, line 30 "aforesaid" should read --aftersaid--;

Col. 6, line 34 "compounds" should read --compound--.

SIGNED AND
SEALED
FEB 2 1971

(SEAL)
Attest:

Edward M. Fletcher, Jr.
Attesting Officer

WILLIAM E. SCHUYLER, JR.
Commissioner of Patents